Jan. 10, 1950          L. J. WOLF          2,494,466

VARIABLE SPEED POWER TRANSMISSION

Filed July 15, 1948          3 Sheets-Sheet 1

Inventor.
Lloyd J. Wolf.
By John M Darley
Attorney.

Jan. 10, 1950

L. J. WOLF 2,494,466

VARIABLE SPEED POWER TRANSMISSION

Filed July 15, 1948

Inventor.
Lloyd J. Wolf.
By John Darley
Attorney.

Jan. 10, 1950 L. J. WOLF 2,494,466
VARIABLE SPEED POWER TRANSMISSION
Filed July 15, 1948 3 Sheets-Sheet 3
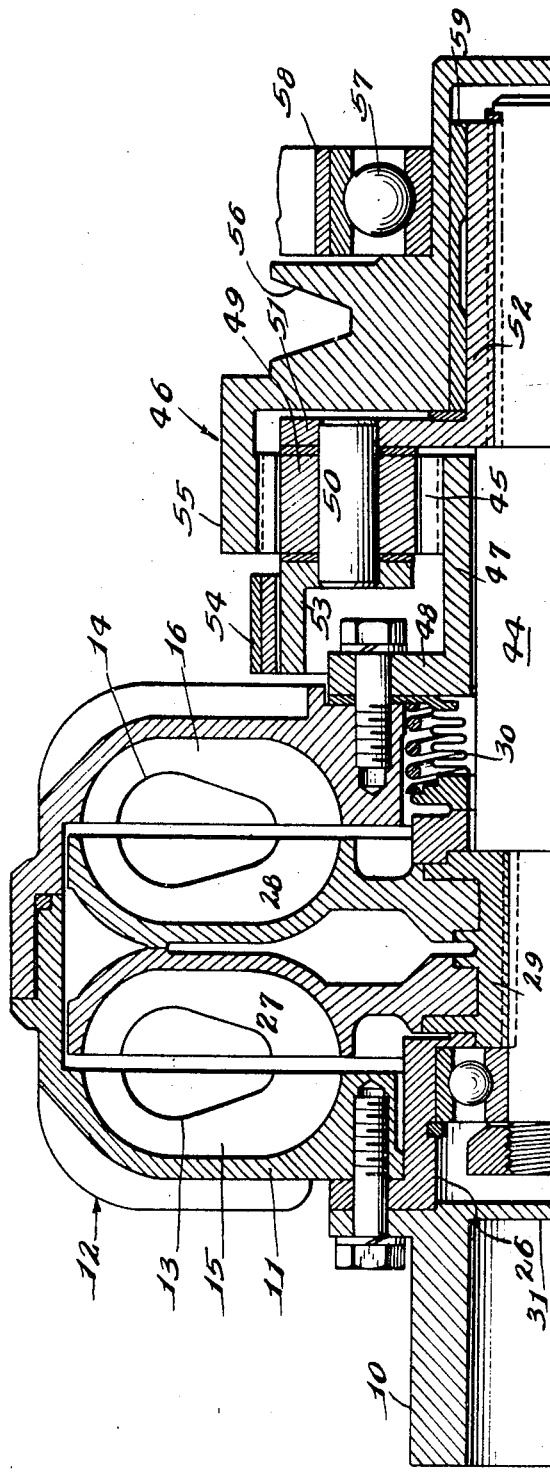
Inventor:
Lloyd J. Wolf.
By John M Darley
Attorney Patented Jan. 10, 1950

2,494,466

UNITED STATES PATENT OFFICE 2,494,466

VARIABLE SPEED POWER TRANSMISSION

Lloyd J. Wolf, Racine, Wis., assignor to Twin Disc Clutch Company, Racine, Wis., a corporation of Wisconsin Application July 15, 1948, Serial No. 38,855

2 Claims. (Cl. 74—688)

My invention relates to an infinitely variable power transmission and more particularly to an arrangement involving the cooperative action of an hydraulic coupling and a planetary gear train which enables the delivered horsepower and torque to be utilized over a more useful range than is possible with the coupling or gear train singly.

One object of the invention is to devise a transmission of the character indicated which provides infinitely variable output speeds while the power source operates at all times under optimum conditions with respect to fuel economy or current consumption and wear.

A further object is to provide a transmission incorporating an hydraulic coupling and a planetary gear train in which the latter controls the slip rate through the coupling up to and including the stall position of the coupling thereby avoiding excessive heating of the working liquid in the coupling.

A further object is to devise a transmission having the foregoing characteristics in which the output shaft speed and torque automatically and instantaneously adjust to meet varying load conditions.

A further object is the provision of a transmission in which the components can be related to divide the available torque so that the portion of the torque applied to one load equals the engine torque while the other torque portion, simultaneously applied to another load, always matches the latter load at varying speeds.

These and further objects of the invention will be set forth in the following specification, reference being had to the accompanying drawings, and the novel means by which said objects are effectuated will be definitely pointed out in the claims.

In the drawings:

Fig. 4 is a further fragmentary section showing another modification in which the ring gear of the planetary system serves as the output member.

Figure 1:
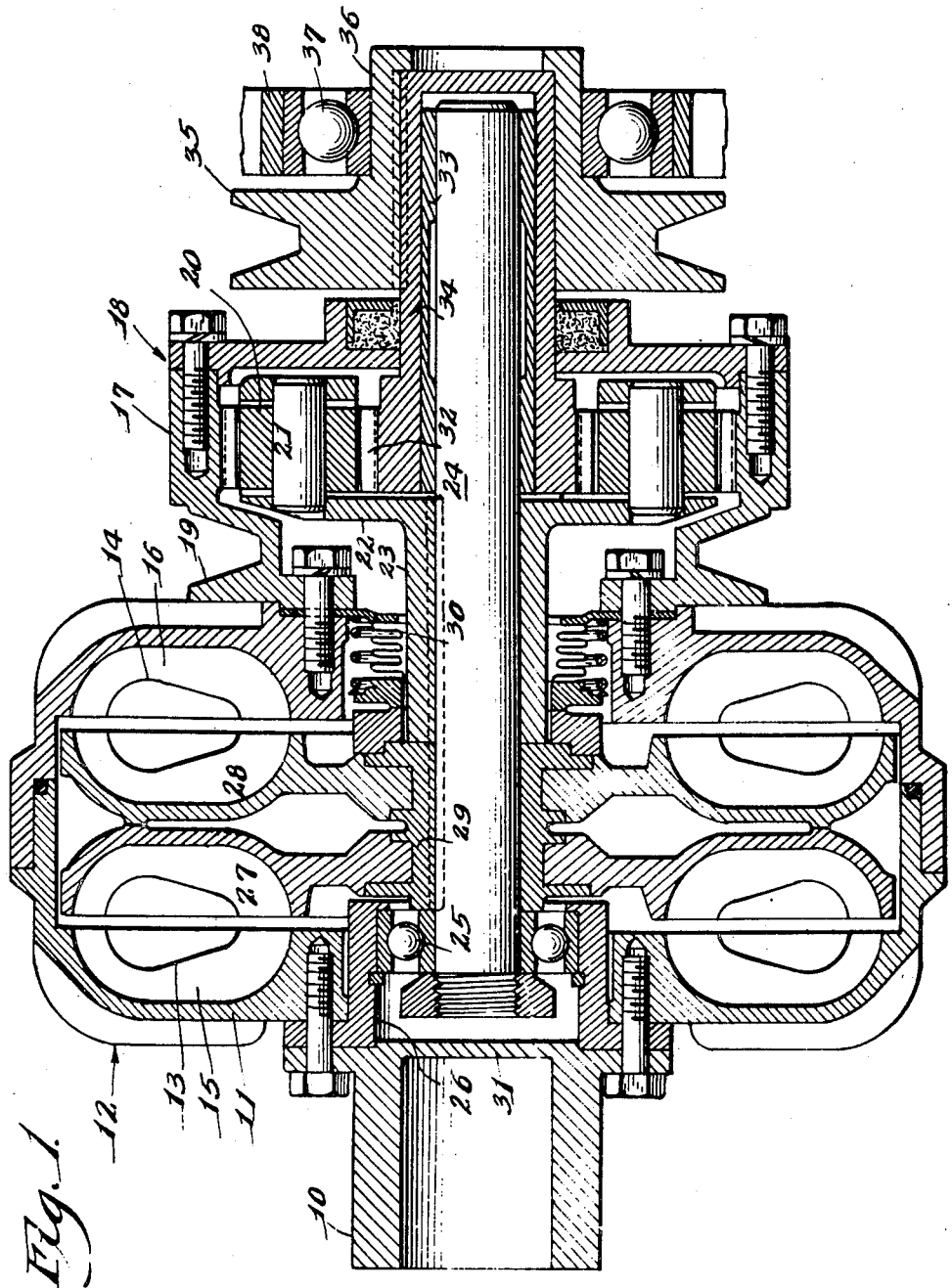
Fig. 1 is a sectional elevation showing one form of my improved transmission including provision for dividing the output torque.

Referring to Fig. 1, the numeral 10 designates a connector whose opposite ends are respectively joined to a power source, such as a turbine, engine or motor (not shown), and one end of an annular housing 11 forming part of an hydraulic coupling 12. The housing 11 includes spaced, transverse walls which are respectively provided internally of the housing with a plurality of radial blades 13 and 14 to thereby form the spaced, facing and connected impellers 15 and 16, respectively, of the coupling and which cooperate in the usual manner with twin runners or turbines presently described.

Bolted to the other end of the housing 11 is an internal ring gear 17 forming part of a planetary gear train 18. Integrally formed with or otherwise secured to, the ring gear 17 and positioned therebetween and the adjacent end of the housing is a pulley 19 which constitutes one of the output members of the transmission. From the foregoing, it will be understood that the coupling impellers 15 and 16, the ring gear 17 and the pulley 19 always rotate at engine speed. The pulley 19 is suitably connected to a load and may be replaced by a gear as an equivalent if the driving conditions so require.

The ring gear 17 meshes with a plurality of planet pinions 20, each of which is journaled on a stub shaft 21 mounted in a carrier 22 that includes a sleeve 23 keyed or splinedly connected to a shaft 24 coaxial with the impellers. The left end of this shaft, as viewed in Fig. 1, is piloted in a bearing 25 whose outer race is mounted in a sleeve 26 having a flange portion gripped between the connector 10 and the adjacent, transverse wall of the housing 11. The opposite end of the shaft 24 is journaled by means presently described.

Oppositely facing, bladed runners 27 and 28 are symmetrically positioned between the impellers 15 and 16 in working relation thereto, respectively, and their inner portions are secured to a hub 29 which is keyed or splined to the shaft 24. Accordingly, the rotating speed of the planet pinion carrier 22 is always equal to that of the runners. Leakage of liquid from the coupling at the right end is prevented by a bellows seal generally indicated by the numeral 30 and at the opposite end by a web 31 forming part of the connector 10.

The planet pinions 20 also mesh with a sun gear 32 which is journaled on a sleeve 33 that fits on the shaft 24. The sun gear 32 is provided with an extension 34 that is keyed to a second output member, denoted by the pulley 35, which also may be replaced by a gear, and the pulley 35 includes a sleeve 36 journaled in a bearing 37 that is mounted in a supporting frame 38.

Under operating conditions, either the connector 10 or the pulley 19 may be connected to the power source and thus act as the driving member for the transmission. For purpose of description, the connector 10 will be regarded as the driving member and the pulley 19 as a power take-off directly driven by the source of power. If the pulley 19 is employed as the driving member, then the connector 10 can be used as a power take-off.

The rotational speed of the output pulley 35 is controlled by the load imposed thereon and the interaction between the components of the planetary gear train arising from the cooperative action of the mechanical and hydraulic drives in the transmission. The variation in the output speed ranges from zero, which is a stalled position of the pulley 35, to a substantially one to one ratio with the input speed and throughout this range the available horsepower remains constant, thus permitting operation of the power source under optimum conditions. Due to the flexible characteristics of the transmission arising from the ability of the coupling and gear train components to respectively rotate relative to each other, the output speed and torque automatically and instantaneously adjust to varying load conditions. Hence, the torque and delivered horsepower are spread over a much more useful range than is possible with either the coupling or gear train alone.

A further advantage of the transmission is that the gear train controls the amount of slip in the coupling throughout the working range of the transmission, including maximum slip which occurs when the output pulley 35 is stalled. Under the latter condition, the sun gear 32 is stationary and the pinion carrier 22 and the connected runners 27 and 28 are driven by the ring gear 17. The relative slip of the runners is therefore controlled by the gear ratio of the gear train so that heating of the coupling liquid never exceeds that which can be adequately cooled.

The provision of the pulley 19 which is directly connected to the source of power and the pulley 35 which is driven by the cooperative action of the mechanical and hydraulic features of the transmission enables the available torque to be divided between a load requiring direct engine drive and one in which the load conditions require varying torque.

Figure 2:
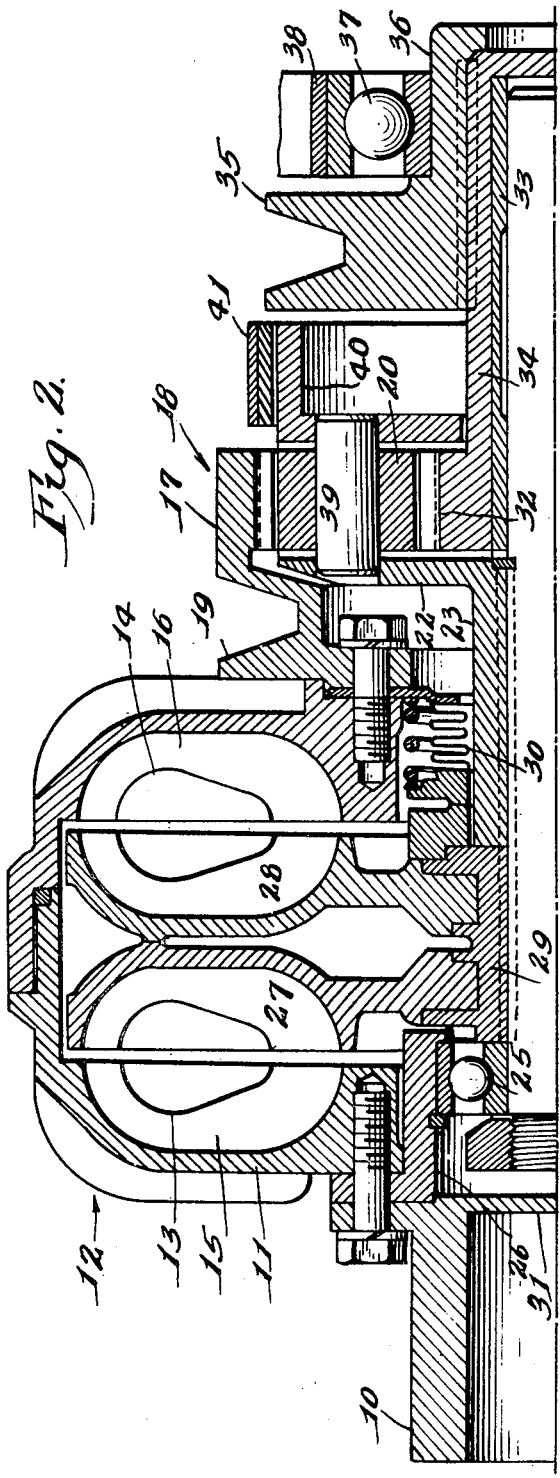
Fig. 2 is a fragmentary, sectional elevation showing a modified arrangement with provision for reversing the output member, the section through the brake being taken along the line 2—2 in Fig. 3.

In Fig. 2 is illustrated a modification of the transmission shown in Fig. 1 in which means is employed for mechanically reversing the output drive to the pulley 35. Since except for this additional feature, the Fig. 2 transmission is identical with that illustrated in Fig. 1, like numerals are applied to like parts.

Figure 3:
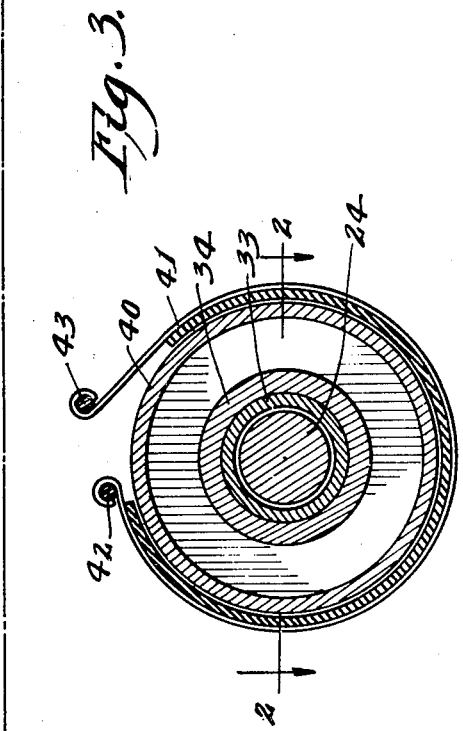
Fig. 3 is a sectional elevation showing the friction band for effecting reversal.

Each of the planet pinion, stub shafts 39 is extended into supporting relation with the transverse wall of a brake drum 40 whose peripheral wall is partially encircled by a brake band 41 (see Fig. 3). The ends of the band 41 are respectively secured to pins 42 and 43 and when these pins are relatively moved in the characteristic manner by well known means (not shown), the band is shifted from the release position shown in Figs. 2 and 3 to one in which it grips the drum 40. Since the drum rotates with and is connected to the pinion carrier 22, tightening of the band 41 stops rotation of the carrier and provides a reverse drive for the pulley 35.

In Fig. 4 is illustrated a further modification which demonstrates the versatility of the transmission in respect of securing any desired gear ratio in the gear train by selecting any component of the gear train for direct drive by the source of power and any other component for drive through the coupling, the remaining component serving as the output member. In the actual form shown in Fig. 4, the sun gear is driven by the source of power, the planet carrier is connected to the runners and the ring gear acts as the output member. Parts in Fig. 4 which are like those in Fig. 1 are designated by the same numerals.

Referring to Fig. 4, the runner hub 29 is keyed to a shaft 44 which is comparable to the shaft 24 in Fig. 1, but possesses a different profile to accommodate the variant arrangement of parts. The sun gear 45 forming part of a planetary gear train 46 includes a sleeve 47 which encircles the shaft 44 in spaced relation thereto and a flange 48 bolted to the adjacent end of the housing 11. Hence, the sun gear 45 is directly connected to the power source.

Meshing with the sun gear 45 is a plurality of planet pinions 49, only one being shown, and each of which is journaled on a stub shaft 50. One end of the shaft 50 is mounted in a pinion carrier 51 which includes a sleeve 52 that is keyed to the shaft 44 and hence is drivably connected to the runners 27 and 28. The other end of each shaft 50 is supportably related to the transverse wall of a brake drum 53 around whose annular wall is positioned a brake band 54 in the same manner as in Fig. 3.

The planet pinions 49 also mesh with a ring gear 55 which is connected to a pulley 56 that serves as the output member of the transmission and may, if desired, be replaced by a gear. The pulley 56 is journaled in a bearing 57 carried by a frame 58 and interposed between the hub of the pulley and the carrier sleeve 52 is a sleeve bearing 59.

The primary distinction between the Fig. 4 transmission and those shown in the other figures is that the sun and ring gears are in exchanged positions, thus providing a different gear ratio, but the operation remains the same. Reversal of the pulley 56 is effected by applying the band 54 to the drum 53, thereby stopping the rotation of the pinion carrier 51.

It will be apparent that the three component arrangement of the gear train renders available other connections with the coupling. This possibility flows naturally from the well known relations that may be established between the elements of a planetary gear train in selecting any element as an input member and any other element as an output member. For example, the Fig. 4 transmission could be modified to make the pinion carrier 51 the output member and the ring gear 55 would then be connected to the runners 27 and 28. Further, the Fig. 1 transmission could be modified to directly connect the pinion carrier 22 to the housing 11 and, in this case, either the ring gear 17 or the sun gear 32 could be used as the output member of the gear train, with the understanding that the gear not so selected would be connected to the runners 27 and 28. Other variations will be apparent from the above considerations.

The adaptability of the transmission in its various forms is due to the connected relation of the coupling and the planetary gear train whereby all elements of the latter are free to rotate at all times, except under conditions of braking for reverse or stall. The transmission is therefore highly flexible in operation and is able to efficiently handle varying load conditions in respect of output speed and torque. By varying the relations of the gear train components to the coupling, power flow through the unit can be accommodated to varying torque requirements.

The transmission is particularly useful where a quick pick-up of the load is desired, such as where the associated machine load is designed for repetitive, short working cycles and capacity is required for rapid acceleration and quick reversals.

I claim:

1. A power transmission comprising an hydraulic coupling having an impeller and a runner, planetary gear means including a ring gear, a sun gear and a carrier supporting a plurality of planet pinions in mesh with the gears, the ring gear being connected to the impeller and the sun gear being adapted for connection to a load and the carrier being connected to the runner, and brake means for stopping the rotation of the carrier to provide a reverse drive.

2. A power transmission comprising an hydraulic coupling having an impeller and a runner, planetary gear means including a ring gear, a sun gear and a carrier supporting a plurality of planet pinions in mesh with the gears, the ring gear being connected to the impeller and the sun gear being adapted for connection to a load and the carrier being connected to the runner, a brake drum connected to the carrier, and means engageable with the drum for stopping rotation of the carrier to provide a reverse drive.

LLOYD J. WOLF.

REFERENCES CITED

The following references are of record in the file of this patent:

UNITED STATES PATENTS

| Number | Name | Date |
|---|---|---|
| 1,203,265 | Radcliffe | Oct. 31, 1916 |
| 2,135,246 | Yoxall | Nov. 1, 1938 |
| 2,153,997 | Verderber et al. | Apr. 11, 1939 |
| 2,196,585 | Gette | Apr. 9, 1940 |
| 2,284,934 | Watson | June 2, 1942 |
| 2,326,570 | Schaefer et al. | Aug. 10, 1943 |
| 2,329,733 | Watson | Sept. 21, 1943 |
| 2,371,371 | Watson | Mar. 13, 1945 |
| 2,407,289 | LaBrie | Sept. 10, 1946 |
| 2,448,249 | Bonham | Aug. 31, 1948 |